United States Patent [19]

Senda

[11] Patent Number: 5,006,359

[45] Date of Patent: Apr. 9, 1991

[54] PREMIX PREPARATION FOR ICE FOODS

[75] Inventor: Akira Senda, Kanazawa, Japan

[73] Assignee: Daiei Food Industrial Co. Ltd., Ishikawa, Japan

[21] Appl. No.: 134,049

[22] Filed: Dec. 17, 1987

[30] Foreign Application Priority Data

Dec. 27, 1986 [JP] Japan ................. 61-313505

[51] Int. Cl.$^5$ ................... A23L 2/00; A23G 9/00
[52] U.S. Cl. .................... 426/565; 426/566; 426/567; 426/569; 426/602; 426/613; 426/577
[58] Field of Search ............... 426/565, 566, 567, 577, 426/569, 613, 602

[56] References Cited

U.S. PATENT DOCUMENTS

| | | | |
|---|---|---|---|
| 2,941,885 | 6/1960 | Tomlinson | 426/569 |
| 3,628,968 | 12/1971 | Noznick et al. | 426/564 |
| 3,721,571 | 3/1973 | Glicksman et al. | 426/573 |
| 3,746,552 | 7/1973 | Zielinski | 426/565 |
| 3,784,712 | 1/1974 | Glicksman et al. | 426/573 |
| 3,800,036 | 3/1974 | Gabby et al. | 426/567 |
| 3,809,764 | 5/1974 | Gabby et al. | 426/565 |
| 3,949,102 | 4/1976 | Hellyer et al. | 426/566 |
| 4,031,261 | 6/1977 | Durst | 426/569 |
| 4,189,502 | 2/1980 | Rubenstein | 426/249 |
| 4,244,981 | 1/1981 | Blake | 426/567 |
| 4,368,211 | 1/1983 | Blake et al. | 426/564 |
| 4,374,155 | 2/1983 | Igoe et al. | 426/569 |
| 4,571,338 | 2/1986 | Okonogi et al. | 426/569 |
| 4,587,130 | 5/1986 | Stauber | 426/565 |

FOREIGN PATENT DOCUMENTS

| | | | |
|---|---|---|---|
| 962516 | 2/1975 | Canada . | |
| 201974 | 11/1986 | European Pat. Off. . | |
| 2119365 | 8/1972 | France . | |
| 0069859 | 6/1978 | Japan | 426/577 |
| 1324557 | 7/1973 | United Kingdom . | |

Primary Examiner—Jeanette Hunter
Attorney, Agent, or Firm—Sandler, Greenblum & Bernstein

[57] ABSTRACT

Premix preparation for ice foods comprising, as essential components, (1) an unsaturated fatty acid-free oil, (2) a glycerin fatty acid ester and (3) a mixture of pectin and pregelatinized starch. The premix preparation being capable of stably maintaining an emulsifized state of the preparation, providing a product capable of preserving for a long period, avoiding a deterioration of the taste under the sterilization at a high temperature, and enabling to easily make a shake at home.

22 Claims, No Drawings

PREMIX PREPARATION FOR ICE FOODS

BACKGROUND OF THE INVENTION

1. Field of the Invention

The present invention relates to a premix preparation for ice foods. More particular, the present invention relates to a premix preparation which after freezing, can be mixed with milk or milk beverages to make drinkable ice foods such as shake. According to the present invention, shake and other ice foods can be easily and instantly made at home.

2. Description of the Related Art

Typical ice foods include ice cream such as ice cream and ice milk, and soft ice cream, i.e., semisolid ice cream. As is well-known in the art, the ice cream generally consist of a milk fat, a solid not fat (SNF), a sweetener, a stabilizer, an emulsifying agent, a flavoring agent, a food color and water. They are produced, for example, by blending the above starting materials, sterilizing the resulting ice cream mix, and freezing and hardening said mix. However, since this production of the ice cream needs complicated and troublesome operations and specific and expensive equipments such as freezers, it is very difficult to easily make the ice cream at home.

Recently, shake foods such as milk shake, vanilla shake and strawberry shake, which are called "a drinkable soft ice cream" become popular among young men and women and children. Generally, they are made by dissolving milk, an edible oil, a sweetener, an emulsifying agent, a flavoring agent, a food color and other optional materials in water and partially freezing the resulting solution at a temperature of $-2$ to $-5°$ C. with stirring. The thus prepared shake foods exhibit a lower degree of freezing of water and a higher foam content in comparison with the ice cream and soft ice cream and therefore can be sucked through a straw.

However, the production of such shake products suffers from many problems similar to those experienced in the production of the ice cream and soft ice cream. Namely, since this production process for the shake products is troublesome and also needs specific and expensive equipments such as a soft cream maker and the like, it is impossible to make the shake products at home without difficulty.

It is, therefore, an object of the present invention to provide a premix preparation for ice foods, from which shake and other ice foods can be easily produced.

SUMMARY OF THE INVENTION

According to the present invention, there is provided a premix preparation for ice foods comprising, as essential components, (1) an unsaturated fatty acid-free oil as an edible oil, (2) a glycerin fatty acid ester as an emulsifying agent, and (3) a mixture of pectin and pregelatinized starch as a stabilizer.

Before inventing the present invention, I first found that when starting materials which are conventionally used in the production of shake, i.e., an edible oil, a sweetener, an emulsifying agent, a flavoring agent, a food color and the like, are emulsified in water, and then the emulsion is frozen to a softly frozen state, a shake-like ice food can be easily made upon addition of milk and mixing. The shake produced was satisfactory to both of taste and flavor.

Second, I tried to produce a retort product of the above shake-like ice food. However, unfortunately, the sterilization of such food at an elevated temperature which is essential to the production of retort food products adversely affected a state of the emulsion of the starting materials. When the emulsion was heated at a high temperature for sterilization, an uniformly emulsified state of the emulsion was broken and a quality of the oil used was lowered and changed. Because of these defects, after the subsequent freezing, only the shake-like food products not having a good taste and flavor could be obtained. I, therefore, zealously studies to find starting materials which are useful in the production of the retort-type shake-like ice foods and are not adversely affected by heating at a sterilization temperature. Now, I invented the present invention which was briefly described above.

In the premix preparation according to the present invention, oils which do not contain an unsaturated fatty acid are used as an edible oil. Since these oils are not oxidized when heated to a sterilization temperature of $120°$ C. or more, deterioration of the taste and flavor of the final food products due to modification of the oils can be effectively prevented.

Further, since glycerin fatty acid esters are used as an emulsifying agent and a mixture of pectin and pregelatinized starch as a stabilizer, an emulsified state of the blended starting materials can be stably maintained during the retort treatment thereof at a high temperature.

Furthermore, the premix preparation of the present invention can be frozen and reserved for a long period without deterioration or variation thereof. Accordingly, the frozen premix preparation can be put on the market and a person who bought it can easily and instantly make a shake drink by only mixing said preparation with milk or milk beverages with stirring. In addition, this frozen preparation can be also used as a starting material for the preparation of other ice foods such as ice cream and soft ice cream.

DESCRIPTION OF PREFERRED EMBODIMENTS

In a preferred embodiments of the present invention, the premix preparation comprises a sweetener, an edible oil, an emulsifying agent, a stabilizer and water. This preparation may also contain a flavoring agent, a food color or color dye and other additives.

As the sweetener, there can be used a variety of well-known sweeteners such as sucrose, an invert sugar, a mixed liquid sugar, glucose, malt honey and the like. Preferably, these sweeteners are used alone or in combination in an amount of about 20 to 40% by weight, based on a total amount of the preparation including water. The sweetener of less than 20% by weight is not satisfactory, since it causes a problem that a soft frozen state is not obtained after freezing. The preparation containing more than 40% by weight of the sweetener is also not satisfactory, since it causes another problem, i.e., being too sweet and thus undrinkable, while a soft frozen state can be obtained.

In the premix preparation of the present invention, oils not containing an unsaturated fatty acid are used as the edible oil. Typical examples of such oils include fatty acid triglycerides, preferably medium-chain fatty acid triglyceride, for example, PANACETE 810 (trade name; commercially available from Nippon Yushi K.K.) and the like. These oils are preferably used in an addition amount of about 2 to 10% by weight, based on a total amount of the preparation including water. If they are used in an amount out of the weight range described, new problems will be caused. The oil of less than 2% by weight will result in a sherbet-like product upon freezing, and the oil of more than 10% by weight will provide a product having a too heavy taste due to increase of the amount of the oily substances.

Glycerin fatty acid esters are used as the emulsifying agent in the premix preparation of the present invention. Among various emulsifying agents generally well-known in the art, such as fatty acid esters of glycerin, sorbitan or sucrose and lecithin, I found through the experiments that glycerin fatty acid esters, particularly hexaglycerin monostearate, are the most excellent, since they can maintain an emulsion state of the resulting premix preparation when subjected to the retort treatment at 120° C. or more. For example, hexaglycerin monostearate is commercially available under the trade name "SY GRESTER MS-500" from Sakamoto Yakuhin Kogyo K.K. An addition amount of this emulsifying agent is preferably about 0.1 to 1% by weight, based on a total amount of the preparation including water. This agent of less than 0.1% by weight will cause a problem that the resulting premix preparation is not emulsified upon mixing, and this agent of more than 1% by weight will cause another problem that a flavor of this agent itself deteriorates a taste of the premix preparation.

Further, pectin and pregelatinized starch are used, in combination, as the stabilizer in the premix preparation of the present invention. I found through the experiments that these two agents can effectively stabilize an emulsification of the premix preparation during the retort treatment thereof at a high temperature, only when used as a mixture, and that other well-known stabilizers such as gelatin, guar gum, locust bean gum, carragheenan, CMC (carboxy methyl cellulose) and the like can not provide such stabilization effect.

As the pectin of said stabilizer mixture, low methoxy (LM) pectin is preferably used. Also, as the pregelatinized starch, any types of such starches, for example, those derived from the resources such as corns, potatoes, sweet potatoes and the like can be used. An addition amount of said pectin is preferably in the range of about 0.5 to 1.5% by weight, based on the amount of the premix preparation including water. When the amount of pectin used is less than 0.5% by weight, it causes a problem that a shake-like can not been made because of lowering of the viscosity of said preparation. And, pectin of more than 1.5% by weight causes another problem that the frozen premix preparation is hardly miscible with milk because of increase of the viscosity of said preparation. Also, an addition amount of said pregelatinized starch is preferably in the range of about 1.5 to 2.5% by weight, based on the amount of the premix preparation including water. This is because, when the frozen premix preparation is mixed with milk, this starch of less than 1.5% by weight results in a pudding-like low viscosity product, and this starch to more than 2.5% by weight results in a problem that we cannot suck the resulting shake-like product through a straw.

To the premix preparation according to the present invention, any additional starting materials such as a flavoring agent such as fruit essences and vanilin, coloring dyes such as β-carotene and the like may be added. In addition, any dairy products such as cream, whole condensed milk, butter, butter oil, skim milk powders and the like may be added to said premix preparation, if desired.

Using the starting materials described above in detail, the premix preparation of the present invention can be produced as follows. First, the selected starting materials are added to a predetermined amount of water,. and are dissolved and emulsified, preferably with stirring at a temperature of 70° C. and more. A premix preparation of the present invention in the form of an aqueous emulsion is thus obtained. Thereafter, this emulsion of the premix preparation is charged and sealed in a heat-resistant plastic pouch, and heated to a temperature of 120° C. and more for retort sterilization. As a result of heating at a high temperature, the emulsion is now stably storable for a long time without generation and proliferation of bacteria and microorganisms. The sterilized emulsion in the pouch is then frozen and reserved in a refrigerator. The frozen product may be transported to other locations to meet the demands. Just before drinking, the frozen product is opened and a content thereof, namely, frozen emulsion of the premix preparation, is mixed with milk and the like with stirring and frothing. An ice food such as shake is produced, accordingly.

The premix preparations of the present invention and excellent effects thereof will be more appreciated by referring the following examples:

Production of the premix preparations

Two samples of the premix preparations according to the present invention and five samples of the premix preparations (controls) were prepared. Sample No. 1 (present invention):

Starting materials listed in the following Table 1 were mixed in the described weight ratio and heated to a temperature of 70 to 80° C. They were emulsified in water. The resulting aqueous emulsion was labeled "Sample No. 1". This sample of the premix preparation had a strawberry taste. Sample No. 2 (present invention):

The production process of said sample No. 1 was repeated with the provision that the starting materials shown in the following Table 1 were used in the indicated weight ratio. The resulting emulsion, labeled "Sample No. 2", had a vanilla taste.

TABLE 1

| starting material | Sample No. 1 wt. % | Sample No. 2 wt. % |
| --- | --- | --- |
| hexaglycerin monostearate* | 0.5 | 0.5 |
| pectin (LM pectin) | 0.9 | 0.9 |
| pregelatinized starch** | 2.2 | 2 |
| glucose | 19 | 20 |
| granulated sugar | 5 | 5 |
| medium-chain fatty acid triglyceride*** | 6 | 6 |
| strawberry sauce | 5.3 | — |
| strawberry flavor | 0.1 | — |
| vanilin | — | 0.05 |
| vanilla flavor | — | 0.1 |
| water (buffer solution of pH = 4.6) | 61 | 63.45 | hexaglycerin monostearate* "SY GRESTER MS-500" (trade name) commercially available from Sakamoto Yakuhin Kogyo
pregelatinized starch** "FERRINECS CA" (trade name) commercially available from Matsutani Kagaku K.K.
medium-chain fatty acid triglyceride*** "PANACETE 810" (trade name) commercially available from Nippon Yushi K.K.

Sample No. 3 (control):

The production process of the sample No. 1 was repeated with the proviso that the medium-chain fatty acid triglyceride as an edible oil was replaced with a coconut oil which contains an unsaturated fatty acid.

Sample No. 4 (control)

The production process of the sample No. 1 was repeated with the proviso that hexaglycerin monostearate as an emulsifying agent was replaced with a fatty acid ester of sucrose.

Sample No. 5 (control):

The production process of the sample No. 1 was repeated with the proviso that a mixture of pectin and pregelatinized starch as a stabilizer was replaced with 1% by weight of guar gum.

Sample No. 6 (control):

The production process of the sample No. 1 was repeated with the proviso that the pectin was omitted from the stabilizer.

Sample No. 7 (control):

The production process of the sample No. 1 was repeated with the proviso that the pregelatinized starch was omitted from the stabilizer.

Tests

State of emulsification:

Each of the samples Nos. 1 to 7 was heated and sterilized at 120° C. for 20 minutes. After the sterilization was completed, a content of the pouch was microscopically observed to estimate a state of the emulsification of the sample. This estimation was made under the following criteria: 3 —A good state of the emulsification of the sample was stably maintained under the conditions of retort sterilization; 2 —A state of the emulsification of the sample was slightly broken during the sterilization; 1—A state of the emulsification of the sample was notably broken, thereby resulting in separation of the sample into oil and water. The results are summarized in the following Table 2.

Organoleptic test:

Two different organoleptic tests were made to evaluate the samples with regard to (1) feeling on the tongue (texture) and (2) taste. Ten panellers attended on these tests.

Each of the samples Nos. 1 to 7 was heated and sterilized at 120° C. for 20 minutes. After the sterilization was completed, the sample was frozen at −20° C. for 5 hours in a refrigerator. A softly frozen product was obtained. This product was then mixed with the equivalent amount of milk to prepare a shake.

The shake obtained was tested for the feeling on the tongue and taste. The results are summarized in the following Table 2 in which 3 means "good", 2 "fair" and 1 "poor", respectively. In the table 2, columns "feeling on tongue" and "taste", the points described are a sum of the evaluation points given by the ten panellers.

TABLE 2

| sample No. | state of emulsification | feeling on tongue | taste |
|---|---|---|---|
| 1 | 3 | 28 | 28 |
| 2 | 3 | 26 | 28 |
| 3 | 3 | 25 | 12 |
| 4 | 1 | 23 | 16 |
| 5 | 2 | 11 | 15 |
| 6 | 2 | 20 | 25 |
| 7 | 2 | 22 | 26 |

As is understood from the data of this table, the premix preparations according to the present invention (samples Nos. 1 and 2) ensures to stably maintain an emulsified state of the preparation during the sterilization at a high temperature, and to confer to the resulting shake a good feeling on the tongue and a good taste.

In contrast to these satisfactory effects, the premix preparations prepared using the emulsifying agent and stabilizer out of the scope of the present invention (samples Nos. 4 to 7) provided only the shake having less feeling on the tongue and less taste, because they were adversely affected by the heat in a high temperature sterilization. Further, the premix preparation produced using an edible oil out of the scope of the present invention (sample No. 3), when mixed with milk to make a shake, provided only the shake having unsatisfactory taste.

I claim:

1. A storage stable aqueous emulsion comprising:
   (a) 2–10% by total weight of said emulsion of an edible oil consisting essentially of saturated fatty acids comprising medium chain triglycerides;
   (b) an emulsifying agent comprising fatty acids selected from the group consisting of fatty acid esters of glycerin, fatty acid esters of sorbitan, fatty acid esters of sucrose, lecithin and hexaglycerin monostearate;
   (c) a stabilizer comprising a stabilizer mixture of pectin and pregelatinized starch
   (d) a sweetener; and
   (e) water.

2. The aqueous emulsion according to claim 1 comprising 20 to 40% by weight, based on a total amount of the emulsion of said sweetener, 0.1 to 1% by weight of said emulsifying agent, 2.0 to 4.0% by weight of said stabilizer, and 40 to 70% by weight of water.

3. The storage stable aqueous emulsion according to claim 1, wherein said stabilizer mixture comprises 0.5 to 1.5% by weight of pectin and 1.5 to 2.5% by weight of pregelatinized starch.

4. The storage stable aqueous emulsion according to claim 3, wherein said aqueous emulsion is retorted.

5. The storage stable aqueous emulsion according to claim 4, wherein said retorted aqueous emulsion is frozen.

6. The aqueous emulsion according to claim 1, wherein said emulsifying agent is hexaglycerin monostearate.

7. A beverage product comprising:
   (a) an aqueous emulsion comprising:
      (i) 2–10% total weight of said emulsion of an edible oil consisting essentially of saturated fatty acids comprising medium chain triglycerides,
      (ii) an emulsifying agent,
      (iii) a stabilizer comprising a stabilizer mixture of pectin and pregelatinized starch,
      (iv) a sweetener, and
      (v) water; and
   (b) a liquid 8. The beverage product according to claim 7., wherein said liquid is a dairy product.

9. The beverage product according to claim 7, wherein said dairy product is selected from the group consisting of milk, cream and mixtures of milk and cream.

10. The beverage product according to claim 9, wherein said dairy product is milk.

11. The beverage product of claim 7, wherein said aqueous emulsion comprises based on a total amount of said emulsion 20 to 40% by weight of a sweeter, 0.1 to 1% by weight of said emulsifying agent, 2.0 to 4.0% by weight of said stabilizer mixture, and 40 to 70% by weight of water.

12. The beverage product of claim 11, wherein said stabilizer mixture comprises 0.5 to 1.5% by weight of said emulsion of pectin and 1.5 to 2.5% by weight of said emulsion of pregelatinized starch.

13. The beverage product of claim 7, wherein said stabilizer mixture comprised 0.5 to 1.5% by weight of said emulsion of pectin and 1.5 to 2.5% by weight of said emulsion of pregelatinized starch.

14. The beverage product of claim 13, wherein said aqueous emulsion is frozen.

15. The beverage product according to claim 11, wherein said emulsifying agent is hexaglycerin monostearate.

16. A retort food preparation emulsion comprising:
   (a) 2–10% by total weight of said emulsion of saturated oil comprising medium chain triglycerides;
   (b) an emulsifying agent comprising fatty acids selected from the group consistent of fatty acid esters of glycerin, fatty acid esters of sorbitan, fatty acid esters of sucrose, lecithin, and hexaglycerin monostearate;
   (c) a stabilizer comprising a stabilizer mixture of pectin and pregelatinized starch; and
   (d) water.

17. A retort food preparation emulsion according to claim 16 wherein said emulsifying agent is hexaglycerin monostearate.

18. The retort food preparation emulsion of claim 16, wherein said emulsifying agent is hexaglycerin monostearate.

19. The retort food preparation emulsion of claim 16, wherein said pectin is low methoxy pectin.

20. The retort food preparation emulsion according to claim 16, wherein said emulsifying agent is present in an amount within the range of about 0.1% to 1% by total weight of said emulsion.

21. The retort food preparation emulsion according to claim 16, wherein said stabilizer mixture is present in an amount within the range of about 2.0% to 4.0% by total weight of said emulsion.

22. The retort food preparation emulsion according to claim 16, wherein said water is present in the amount within the range of about 40% to 70% of said emulsion.

* * * * *